United States Patent [19]
Forster

[11] Patent Number: 5,813,938
[45] Date of Patent: Sep. 29, 1998

[54] WHEEL MOUNTING HUB SYSTEM

[75] Inventor: Franz Forster, Karlstadt-Mühlbach, Germany

[73] Assignee: Linde Aktiengesellschaft, Germany

[21] Appl. No.: 617,500

[22] Filed: Mar. 15, 1996

[30] Foreign Application Priority Data

Mar. 20, 1995 [DE] Germany .......... 195 10 035.2

[51] Int. Cl.⁶ .................................................. F16H 1/36
[52] U.S. Cl. ........................ 475/331; 475/346; 180/372
[58] Field of Search .................... 475/331, 346; 180/372; 384/544, 589

[56] References Cited

U.S. PATENT DOCUMENTS

| | | |
|---|---|---|
| 2,424,578 | 7/1947 | Mortag . |
| 4,091,688 | 5/1978 | Huffman . |
| 4,213,514 | 7/1980 | Ehrlinger et al. ............ 180/308 |
| 4,424,874 | 1/1984 | Koike et al. ................. 180/372 |
| 4,668,111 | 5/1987 | Kapaan . |
| 5,398,776 | 3/1995 | Forster ........................ 180/308 |
| 5,443,316 | 8/1995 | Deane et al. . |

*Primary Examiner*—Charles A. Marmor
*Assistant Examiner*—Sherry Lynn Estremsky
*Attorney, Agent, or Firm*—Webb Ziesenheim Bruening Logsdon Orkin & Hanson, P.C.

[57] ABSTRACT

A wheel mounting hub system includes a hollow stationary hub carrier with an inner surface and a rotating hub located radially within the stationary hub carrier throughout at least a portion of its axial length. A planetary gear train including a sun gear and planet gears mounted on webs formed on the rotating hub is located within the stationary hub carrier. The planetary gear train includes a ring gear located on the inner surface of the stationary gear carrier in mesh with the planet gears. Axially spaced annular roller bearings are located between the rotating hub and the inner surface of the stationary hub. Outer bearing races for the roller bearings are formed on the inner surface of the stationary hub carrier and inner bearing races are located on the outer surface of the rotating hub.

19 Claims, 2 Drawing Sheets

WHEEL MOUNTING HUB SYSTEM

BACKGROUND OF THE INVENTION

1. Field of the Invention

This invention relates generally to a wheel mounting system including a stationary hub carrier and a rotating hub for supporting a wheel rim, and more particularly to a system wherein the rotating hub forms the webs of a planetary gear train having planet gears engaged with a sun wheel and with a ring gear formed on the inner surface of the stationary hub carrier. Two annular roller bearings are located between the outer surface of the rotating hub and the inner surface of the stationary hub carrier and axially spaced annular bearing races are cast on the inner surface of the stationary hub carrier.

2. Description of Related Prior Art

A prior art wheel mounting system including a planetary gear train is disclosed in U.S. Pat. No. 5,398,776 entitled "Wheel Hub Drive". In the prior art wheel mounting system, the rotating hub is located radially outwardly of the stationary hub carrier and the roller bearings for the rotating hub are located radially outwardly of the planetary gear train. This arrangement results in a certain minimum radial size of the wheel mounting system. Consequently, the only wheel rims which can be connected to the rotating hub have an inside diameter which is not less than a specified minimum.

SUMMARY OF THE INVENTION

The object of this invention is to create a wheel hub mounting system which has relatively small radial and axial dimensions, is easy and inexpensive to manufacture, and has relatively few component parts permitting easy assembly.

This object is accomplished by locating the rotating hub radially within the hollow stationary hub carrier over a portion of its axial length and locating the annular roller bearings and the planetary gear train axially adjacent to one another. The outer bearing races for the annular roller bearings and the ring gear of the planetary gear train are formed on the annular inner surface of the hollow stationary hub carrier. The system of the invention makes it possible to mount wheels with rims having small diameters and the system has relatively few parts so that it can be manufactured and assembled economically. The wheel mounting hub system of the invention can be assembled and disassembled easily and quickly.

The inner bearing race for the roller bearing which is axially closer to the planetary gear train is advantageously cast on the outer annular surface of the rotating hub, and the inner bearing race for the roller bearing which is axially farther from the planetary gear train is cast on an annular raceway member which is fastened on the rotating hub. Following assembly, the annular roller bearings are maintained in the installed position by forces exerted thereon by the inner bearing races. The annular roller bearings may be either tapered roller bearings or annular tapered ball bearings.

In one embodiment of the invention, the distal end of the raceway member which forms the inner bearing race for the annular roller bearing which is axially farther from the planetary gear train is located in the same radial plane as a contact surface which is located on the rotating hub which contacts the surface of the disk of the wheel rim which is mounted on the rotating hub. After the wheel rim is bolted in place in the embodiment, the raceway member is prevented from axial movement, even when impact loads are exerted on the rotating hub.

The contact surface of the rotating hub is provided with a plurality of radially spaced concentric axial holes for receiving wheel rim fastening bolts. The diameter of the outer envelope of the holes is smaller than the diameter of the inner envelope of the annular roller bearings. In the wheel mounting hub systems of the prior art, the length of the wheel fastening bolts had to be considered in addition to the axial width of each bearing and the axial distance between the two bearings in determining the overall axial length of the system. This arrangement provides for a minimum axial dimension of the hub system. The radially spaced concentric axial holes are advantageously formed as blind holes so that when the wheel fastening bolts are removed, lubricant does not escape from the inside of the hub system through the empty holes.

It is advantageous to make the depth of the holes and the length of the wheel fastening bolts sufficiently long to permit simultaneously connecting a first wheel rim and a second wheel rim to the rotating hub. This makes it possible to utilize dual tires without the necessity of longer wheel fastening bolts when two wheel rims are connected to the hub system. The wheel fastening bolts will extend less deeply into the axial holes, but will still be threaded into the holes a sufficient distance to achieve a strong connection between the wheel rims and the rotating hub.

It is advantageous to locate a flexible shaft seal between the outer surface of the rotating hub and the surrounding inner surface of the stationary hub carrier axially between the annular roller bearing which is farther from the planetary gear train and the surface of the disk of the first wheel rim. Because of its location, the shaft seal can be axially removed without having to remove or disassemble the bearings or any components of the planetary gear train. In conventional hub systems, it is generally necessary to remove the bearings to replace a seal which destroys the bias between the bearings. This makes it necessary to reestablish the correct bias when the hub system is reassembled. This difficult and time-consuming procedure is unnecessary with the hub system of the present invention. If there is an axial space between the surface of the disk of the first wheel rim and the adjacent end surface of the stationary hub carrier, the shaft seal is provided with mechanical protection.

A complete understanding of the invention will be obtained from the following description when taken in connection with the accompanying drawing figure wherein like reference characters identify like parts throughout.

DESCRIPTION OF THE PREFERRED EMBODIMENT

Figure 1:
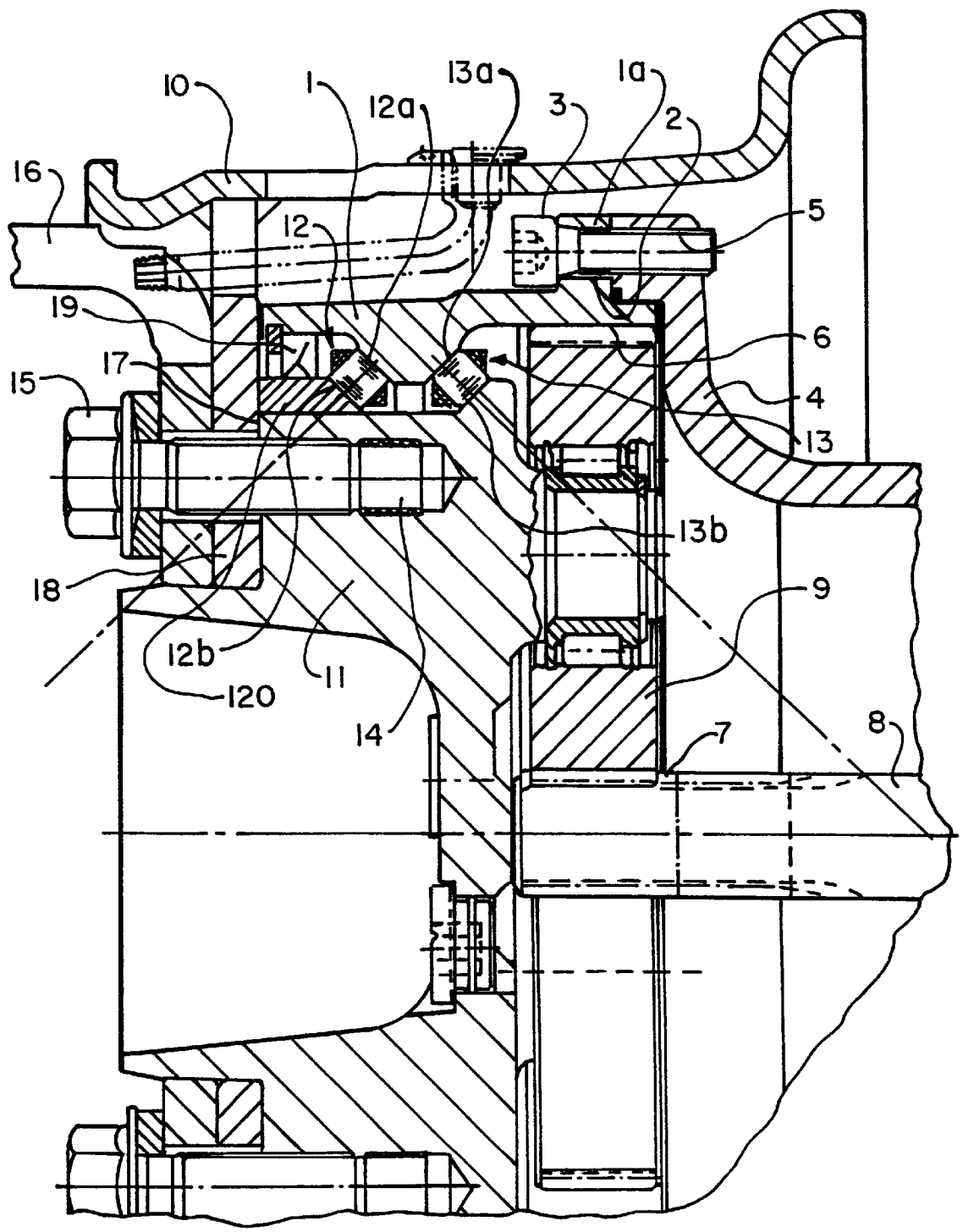
FIG. 1 is a longitudinal axial section through a portion of the wheel mounting hub system of the invention.

The wheel mounting hub system has a hollow outer stationary hub carrier 1 with an outwardly extending radial flange 1a cast on one end. The radial flange is provided with a plurality of radially spaced concentric axial holes 2 for the fastening bolts 3. Radially spaced threaded holes 5 are located in the radial flange of a component 4 having an inner annular portion fixed to the vehicle and are coaxial with the holes 2 in the flange 1a. Instead of the threaded holes 5, threaded bolts with nuts on the ends can be utilized to connect the flange 1a of the stationary hub carrier 1 to the flange of the component 4.

Figure 2:
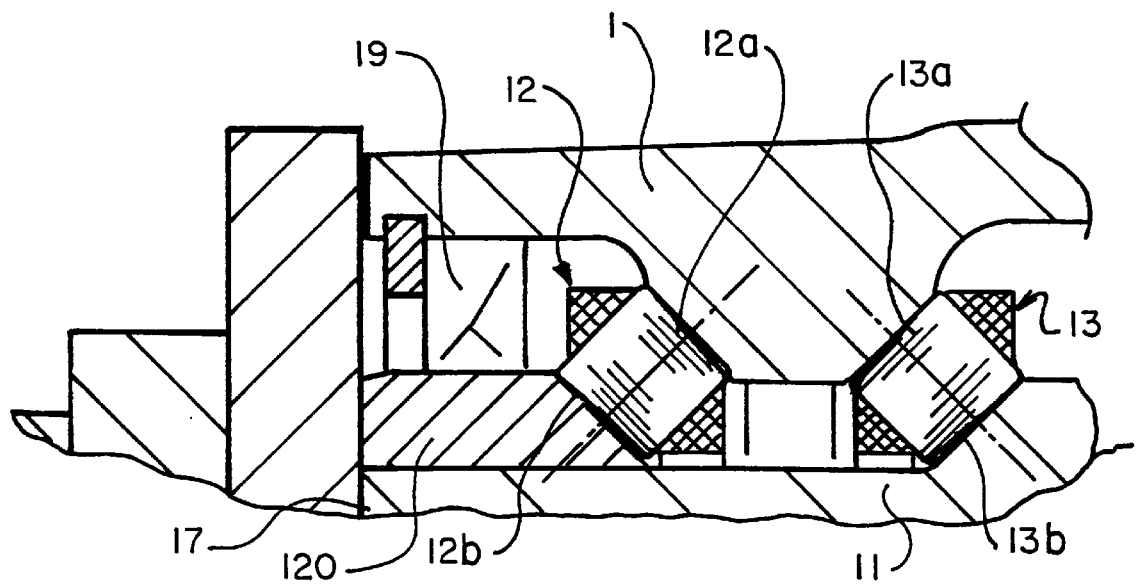
FIG. 2 is an enlarged section of annular roller bearings of the wheel hub system shown in FIG. 1.
Figure 3:
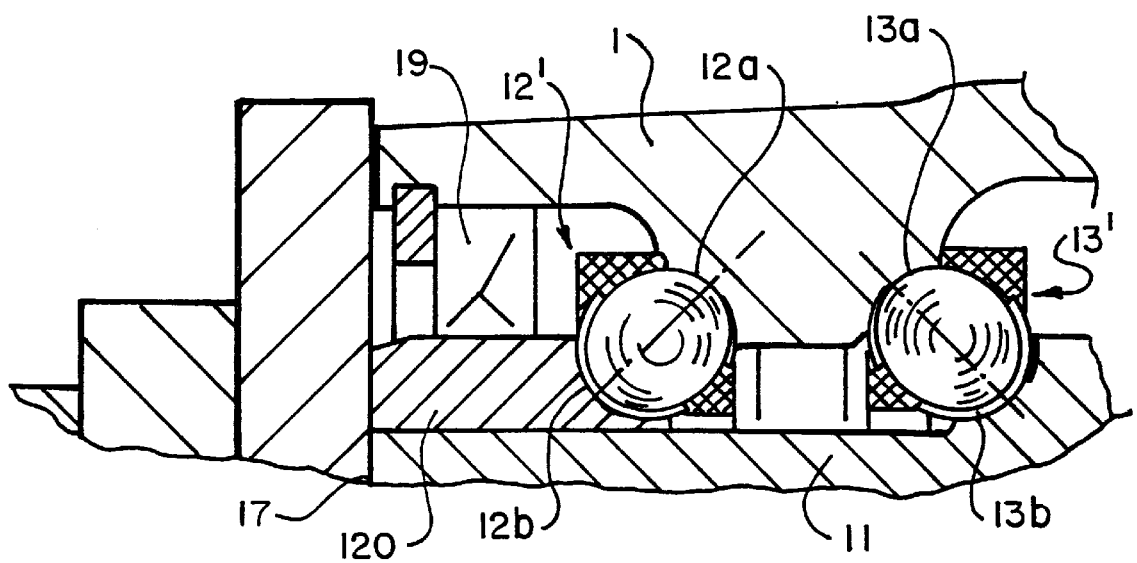
FIG. 3 is an enlarged section of annular roller bearings of a modified wheel hub system of the invention.

A ring gear 6 which is a part of a planetary gear train is located on the inner surface of the flange 1a of the hollow stationary hub carrier 1. The planetary gear train includes a central sun gear 7 which, in this embodiment of the invention, is formed on one end of an engine drive shaft 8. Planet gears 9 are engaged between the ring gear 6 and the sun gear 7 and are rotationally mounted on axial webs which are formed on the rotating hub 11. The rotating hub 11 is rotationally mounted within the hollow stationary hub carrier 1 by two axially spaced tapered annular roller bearings 12 and 13 shown in detail in FIG. 2. The radially outer bearing races 12a and 13a for the tapered roller bearings 12 and 13 are formed on the inside surface of the hollow stationary hub carrier 1. Ball bearings 12' and 13' may also be used in place of tapered roller bearings 12 and 13 as shown in FIG. 3.

The radially inner bearing race 13b for the tapered roller bearing 13 is formed on the outer surface of the rotating hub 11 and the inner bearing race 12b for the tapered roller bearing 12 is formed on an inner raceway member 120 which is non-rotationally fastened on the outer surface of the rotating hub 11. The raceway member 120 is preferably fastened to the rotating hub by a shrink fit or a press fit, after the installation of the tapered annular roller bearings 12 and 13.

As a result of the configuration and the location of the tapered annular roller bearings 12 and 13, the tapered annular roller bearings 12 and 13 can be located relatively close o one another in spite of the high loads which are exerted on the hub system. This is advantageous because it provides a hub system having a short axial length. Additionally, the arrangement facilitates the installation of the tapered annular roller bearings 12 and 13.

The rotating hub 11 is provided with a plurality of radially spaced concentric axial blind holes 14 for the threaded wheel fastening bolts 15. The outer diameter of the envelope of the holes 14 is smaller than the inner diameter of the annular roller bearings 12 and 13. Some of the wheel fastening bolts 15 are axially located in the vicinity of the transverse direction of the two annular roller bearings 12 and 13, which results in a minimum axial dimension of the hub system. When the wheel fastening bolts 15 are removed from the holes 14, the escape of lubricant from the inside of the hub system is prevented because the holes 14 are blind holes.

The depth of the holes 14 and the length of the wheel fastening bolts 15 are both selected so that the wheel rim 10 and a second wheel rim 16 can be simultaneously fastened to the rotating hub 11. This arrangement makes it possible to fasten dual tires to the hub system without using longer wheel fastening bolts 15.

When the two wheel rims 10 and 16 are simultaneously fastened to the rotating hub 11, the wheel fastening bolts 15 extend a shorter distance into the holes 14 than when only one wheel rim 10 is bolted to the rotating hub 11. However, as shown in the accompanying drawing figure, the length of the bolt which is threaded into the hole 14 is sufficient to provide a secure connection.

The inner raceway member 120 for the tapered annular roller bearing 12 which is axially farther from the planetary gear train has its end spaced away from the roller bearing 12 located in the same radial plane as a contact surface 17 on the end of the rotating hub 11. The contact surface 17 contacts a surface of the disk 18 of the wheel rim 10. When the wheel rim 10 is fastened to the rotating hub 11, the inner raceway member 120 is prevented from shifting axially as a result of the impact load.

A flexible shaft seal 19 is located between the outer surface of the rotating hub 11 and the inner surface of the stationary hub carrier 1. The shaft seal 19 is axially positioned between the annular roller bearing 12 and the disk 18 of the wheel rim 10. When the hub system is disassembled, the wheel fastening bolts 15 are removed and the wheel rim(s) 10 and 16 and the shaft seal 19 are removed without removing or disassembling the annular roller bearings 12 and 13, or the planetary gear train. If there is a space between the surface of the disk 18 and the facing end of the stationary hub carrier 1, a mechanical member is provided to protect the shaft seal 19.

While an embodiment of the invention has been described in detail herein, it will be understood by those skilled in the art that additional modifications and alternatives to the described embodiment can be developed in light of the overall teachings of the disclosure. Accordingly, the particular embodiment shown in the drawing is illustrative only and is not limiting as to the scope of the invention which is to be given the full breadth of the appended claims and any and all equivalents thereof.

I claim:

1. A wheel mounting hub system including a hollow stationary hub carrier having an inner surface and a rotating hub having an outer surface, a planetary gear train located within said hollow stationary hub carrier and including a plurality of planet gears and a sun gear, a plurality of webs formed on said rotating hub supporting said planet gears in said planetary gear train, said planetary gear train including a ring gear on said inner surface of said hollow stationary hub carrier, axially spaced annular roller bearings located between said outer surface of said rotating hub and said inner surface of said hollow stationary hub carrier, and outer bearing races for said annular rolling bearings formed on said inner surface of said hollow stationary hub carrier, wherein said rotating hub is located radially within said hollow stationary hub carrier throughout at least a portion of its axial length, and said annular roller bearings and said planetary gear train are located axially adjacent to one another including an inner bearing race for one of said annular roller bearings on said outer surface of said rotating hub, an inner raceway member non-rotationally mounted on said outer surface of said rotating hub and a bearing race for another of said annular roller bearings on said inner raceway member, wherein said inner raceway member has a distal end in contact with a disc of a wheel rim connected to said rotating hub by fastening bolts.

2. A wheel mounting hub system as set forth in claim 1, wherein said rotating hub has an end with a contact surface and said inner raceway member has said distal end in the same radial plane as said contact surface wherein said distal end of said inner raceway member and said contact surface of said rotating hub are adapted to contact said disk of a wheel rim connected to said rotating hub.

3. A wheel mounting hub system as set forth in claim 2, wherein said axially spaced annular roller bearings are tapered roller bearings, and wherein said outer bearing races for said tapered roller bearings have substantially the same diameter and are positioned between said planetary gear train and a contact surface of said rotary hub which is adapted to contact a disk of a wheel rim connected to said rotating hub.

4. A wheel mounting hub system as set forth in claim 2, wherein said axially spaced annular roller bearings are ball bearings, and wherein said outer bearing races for said ball bearings have substantially the same diameter and are positioned between said planetary gear train and a contact surface of said rotating hub which is adapted to contact a disk of a wheel rim connected to said rotating hub.

5. A wheel mounting hub system as set forth in claim 1, wherein said axially spaced annular roller bearings are tapered roller bearings, and wherein said outer bearing races for said annular roller bearings have substantially the same diameter.

6. A wheel mounting hub system as set forth in claim 5, wherein said rotating hub is provided with a plurality of radially spaced concentric axial holes for receiving wheel fastening bolts, whereby the diameter of the outer envelope of said axial holes is smaller than the diameter of the inner envelope of said axially spaced annular roller bearings.

7. A wheel mounting hub system as set forth in claim 1, wherein said axially spaced annular roller bearings are tapered roller bearings, and wherein said tapered roller bearings are positioned on the same side of said planetary gear train.

8. A wheel mounting hub system as set forth in claim 7, wherein a shaft seal is located between said outer surface of said rotating hub and said inner surface of said hollow stationary hub carrier, axially between said another of said annular roller bearings and a disk on a first wheel rim.

9. A wheel mounting hub system as set forth in claim 1, wherein said axially spaced annular roller bearings are ball bearings, and wherein said outer bearing races for said ball bearings have substantially the same diameter.

10. A wheel mounting hub system as set forth in claim 9, wherein said rotating hub is provided with a plurality of radially spaced concentric axial holes for receiving wheel fastening bolts, whereby the diameter of the outer envelope of said axial holes is smaller than the diameter of the inner envelope of said axially spaced annular roller bearings.

11. A wheel mounting hub system as set forth in claim 1, wherein said axially spaced annular roller bearings are ball bearings, and wherein said ball bearings are positioned on the same side of said planetary gear train.

12. A wheel mounting hub system as set forth in claim 1, wherein said rotating hub is provided with a plurality of radially spaced concentric axial holes for receiving wheel fastening bolts, whereby the diameter of the outer envelope of said axial holes is smaller than the diameter of the inner envelope of said axially spaced annular roller bearings.

13. A wheel mounting hub system including a hollow stationary hub carrier having an inner surface and a rotating hub having an outer surface, a planetary gear train located within said hollow stationary hub carrier and including a plurality of planet gears and a sun gear, a plurality of webs formed on said rotating hub supporting said planet gears in said planetary gear train, said planetary gear train including a ring gear on said inner surface of said hollow stationary hub carrier, axially spaced annular roller bearings located between said outer surface of said rotating hub and said inner surface of said hollow stationary hub carrier, outer bearing races for said annular rolling bearings formed on said inner surface of said hollow stationary hub carrier, wherein said rotating hub is located radially within said hollow stationary hub carrier throughout at least a portion of its axial length, wherein said rotating hub is provided with a plurality of radially spaced concentric axial holes for receiving wheel fastening bolts, whereby the diameter of the outer envelope of said axial holes is smaller than the diameter of the inner envelope of said axially spaced annular roller bearings, and said annular roller bearings and said planetary gear train are located axially adjacent to one another.

14. A hub system as set forth in claim 13, wherein said axial holes are blind holes.

15. A wheel mounting hub system as set forth in claim 14, wherein the depth of said blind holes and the length of said wheel fastening bolts are sufficient to simultaneously connect a first wheel rim and a second wheel rim to said rotating hub.

16. A wheel mounting hub system as set forth in claim 15, wherein a shaft seal is located between said outer surface of said rotating hub and said inner surface of said hollow stationary hub carrier, axially between said annular roller bearings and a disk on a first wheel rim.

17. A wheel mounting hub system as set forth in claim 13, wherein said axial holes are blind holes and the depth of said blind holes and the length of said wheel fastening bolts are sufficient to simultaneously connect a first wheel rim and a second wheel rim to said rotating hub.

18. A wheel mounting hub system as set forth in claim 17, wherein a shaft seal is located between said outer surface of said rotating hub and said inner surface of said hollow stationary hub carrier, axially between said annular roller bearings and a disk on a first wheel rim.

19. A wheel mounting hub system including a hollow stationary hub carrier having an inner surface and a rotating hub having an outer surface, a planetary gear train located within said hollow stationary hub carrier and including a plurality of planet gears and a sun gear, a plurality of webs formed on said rotating hub supporting said planet gears in said planetary gear train, said planetary gear train including a ring gear on said inner surface of said hollow stationary hub carrier, axially spaced annular roller bearings located between said outer surface of said rotating hub and said inner surface of said hollow stationary hub carrier, outer bearing races for said annular rolling bearings formed on said inner surface of said hollow stationary hub carrier, an inner bearing race for one of said annular roller bearings on said outer surface of said rotating hub, an inner raceway member non-rotationally mounted on said outer surface of said rotating hub and a bearing race for another of said annular roller bearings on said inner raceway member, wherein said rotating hub is located radially within said hollow stationary hub carrier throughout at least a portion of its axial length, wherein said rotating hub is provided with a plurality of radially spaced axial concentric holes for receiving wheel fastening bolts, whereby the diameter of the outer envelope of said axial holes is smaller than the diameter of the inner envelope of said axially spaced annular roller bearings, and said annular roller bearings and said planetary gear train are located axially adjacent to one another.

* * * * *

UNITED STATES PATENT AND TRADEMARK OFFICE
CERTIFICATE OF CORRECTION

PATENT NO. : 5,813,938
DATED : September 29, 1998
INVENTOR(S) : Franz Forster

It is certified that error appears in the above-identified patent and that said Letters Patent is hereby corrected as shown below:

Column 2 Line 45 "figure" should read --figures--.

Column 2 Line 48 "DRAWING" should read --DRAWINGS--.

Column 3 Line 32 "o one" should read --to one--.

Column 3 Line 60 "figure" should read --figures--.

Column 4 Line 21 "drawing" should read --drawings--.

Claim 1 Column 4 Line 37 "rolling bearings" should read --roller bearings--.

Claim 13 Column 5 Line 58 "rolling bearings" should read --roller bearings--.

Claim 16 Column 6 Line 16 "in claim 15" should read --in claim 14--.

Claim 19 Column 6 Line 43 "rolling bearings" should read --roller bearings--.

Signed and Sealed this

First Day of June, 1999

Attest:

Q. TODD DICKINSON

Attesting Officer

Acting Commissioner of Patents and Trademarks